Patented Sept. 18, 1928.

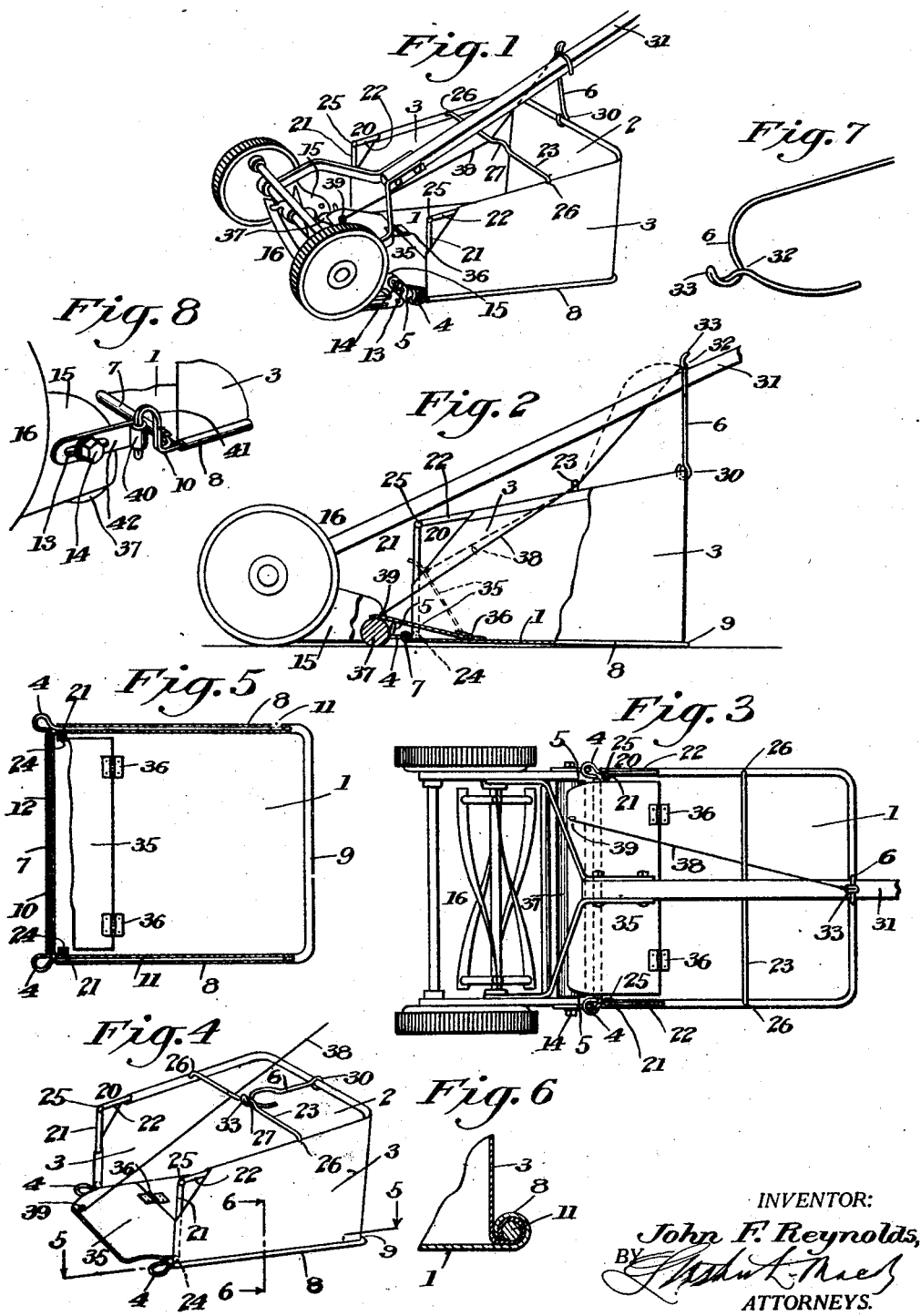

1,684,744

UNITED STATES PATENT OFFICE.

JOHN F. REYNOLDS, OF PASADENA, CALIFORNIA.

GRASS CATCHER.

Application filed February 2, 1926. Serial No. 85,477.

My invention relates to grass catchers for lawn mowers, and the general object thereof is to provide means for throwing the cut grass rearwardly in the catcher to prevent the grass from feeding forwardly out of the front end of the catcher into the mower and onto the ground.

Another object is to provide a grass catcher in which the hook which is used for engaging the lawn mower handle and holding the catcher in place on the mower, may also be used as a handle for carrying and dumping the catcher when the catcher is removed from the mower.

Other objects and advantages will appear hereinafter.

The invention is illustrated in the annexed drawing which forms a part of this specification and in which:

Fig. 1 is a perspective view of my grass catcher applied to a lawn mower.

Fig. 2 is a view partly in longitudinal section and partly in side elevation of my grass catcher and a lawn mower to which the catcher is attached.

Fig. 3 is a plan view of a lawn mower and my grass catcher attached thereto.

Fig. 4 is a perspective view of my grass catcher.

Fig. 5 is a horizontal section of the catcher taken on line 5—5 of Fig. 4.

Fig. 6 is a fragmentary vertical section of the catcher taken on line 6—6 of Fig. 4.

Fig. 7 is a perspective view of the hook for holding the catcher on the lawn mower and which is used as a handle for the catcher when removed from the mower.

Fig. 8 is a fragmentary perspective of a modification of my invention.

Corresponding reference numerals designate the same parts in all the views.

My grass catcher may be of conventional form comprising a sheet metal bottom 1, a rear wall 2 and side walls 3 of canvas or other flexible material, eyes 4 on the front end of the catcher for connecting said end of the catcher to the lawn mower hooks 5, and a hook 6 for holding up the rear end of the catcher on the lawn mower handle.

The bottom 1 is formed with an open seam 7 on its front edge, seams 8 on its side edges and a seam 9 on its rear edge. The lower edge of the material forming the side wall 3 and rear walls 2 is crimped in the seams 8 and 9. The eyes 4 are formed by bending a wire 10 at two spaced points intermediate the ends of the wire, the outer members 11 of the wire being bent rearwardly from the eyes at right angles to the intermediate member 12 of the wire which extends between said eyes. The outer members 11 of the wire are held within the seams 8 with the lower edges of the canvas side walls 3 of the catcher wrapped around said members and crimped within said seams, the members 11 extending nearly the full length of the seams while the intermediate member 12 is rigidly held within the seam 7, leaving the eyes 4 outside the adjacent ends of the seams 7 and 8 at the forward corners respectively of the bottom 1.

The hooks 5 may be of conventional form having slots 13 therein through which are extended bolts 14 screw threaded in the rear frame members 15 of the lawn mower 16, whereby the hooks are adjustably secured to said members so that they may be held in the proper position for engaging the eyes 4.

A frame 20 is provided for supporting the forward edges of the side walls 3 and the upper edges of said walls and the rear wall 2, said frame comprising uprights 21, a U-shaped member 22, and a cross brace 23, said uprights being pivoted at their lower ends at 24 to the bottom 1 at the front corners thereof, and at their upper ends to the forward ends of the U-shaped member 22 at 25, while the cross brace 23 is secured at its ends at 26 to the side members of the U-shaped member 22. The cross brace 23 is formed with an upward bend 27 midway between its ends for the purpose hereinafter described. The forward edges of the side walls 3 are secured to the uprights 21 while the upper edges of said walls and the rear wall 2 are secured to the U-shaped member 20.

The shank of the hook 6 is bent at its end at 30 around the rear member of the U-shaped frame member 22 midway between the side walls 3, whereby the hook is pivotally connected to said rear member so that it may be swung up into vertical position or downwardly and forwardly for the purpose to be described. When in a vertical position the hook 6 is engaged with the handle 31 of the lawn mower 16 for holding the rear end of the catcher in place on the mower. The hook 6 is twisted at 32 at its crown and bent outwardly into an auxiliary hook 33 for engaging the cross brace 23 under the bend 27, when the hook 6 is disengaged from lawn mower handle 31, whereby the hook may be used as a handle for the catcher for carrying and dumping the same when it is detached from the lawn mower.

An apron 35 is hinged by spring hinges 36 at its rear edge to the bottom 1 of the catcher within the forward end thereof, with the forward edge of the apron projecting beyond the forward edge of said bottom so that the forward edge of the apron may engage the upper side of the rear roller 37 of the lawn mower. A cord 38 is connected at one end at 39 to the forward edge of the apron 35 and extends rearwardly under the cross frame member 23 and is connected at its other end to the auxiliary hook 33.

While mowing, the cut grass thrown into the catcher by the mower travels forwardly in the catcher, but before the grass passes out of the front end of the catcher into the mower and onto the ground, the operator draws the string 38 and swings the apron 35 backwardly on its spring hinges 36, whereby the grass in the front of the catcher is thrown back into the rear thereof, thus keeping the grass in the catcher. Upon releasing the string the spring hinges 36 swing the apron back down upon the roller 37 of the lawn mower.

In the modified form of my invention shown in Fig. 8 eyes 40 are substituted for the hooks 5 and hooks 41 are substituted for the eyes 4. The eyes 40 are formed on the rear end of bars 42 provided with slots 13 through which extend the bolts 14 seated in the rear frame members 15 of the lawn mower 16. The hooks 41 are formed by bending the wire 10 upon itself and then bending the paralleled bent portion first upwardly and then forwardly and downwardly into the hooks. The hooks 41 are projected downwardly into the eyes 40 for detachably connecting the catcher to the rear of the lawn mower.

While I have shown and described a preferred embodiment of my invention herein, it will be understood that I may change or modify the same within the scope of the appended claim without departing from the spirit thereof.

What I claim is:

A grass catcher for lawn mowers comprising a metal bottom with seams on the front and sides thereof, a U-shaped wire rigidly held in said seams and having eyes formed at the bends thereof for attachment to a mower, a metal apron hinged to said bottom rearwardly of the front edge thereof and extended forwardly therefrom, a frame comprising a U-shaped member and vertical members pivotally connected together, said vertical members pivotally connected to said U-shaped bottom member, and a fabric receptacle having seams at the margins thereof for receiving said U-shaped member and said vertical members.

JOHN F. REYNOLDS.